United States Patent [19]
Wagner et al.

[11] 3,948,440
[45] Apr. 6, 1976

[54] AUTOMOTIVE COOLING SYSTEM THERMOSTAT

[75] Inventors: Joseph Patton Wagner, Knoxville; Boyd Paul Sliger, Concord, both of Tenn.

[73] Assignee: Robertshaw Controls Company, Richmond, Va.

[22] Filed: Sept. 20, 1974

[21] Appl. No.: 507,844

[52] U.S. Cl.................. 236/34.5; 236/93 R; 248/43
[51] Int. Cl.²........................................... F01P 7/02
[58] Field of Search................... 236/34, 34.5, 93 R; 248/40, 43; 403/361

[56] References Cited
UNITED STATES PATENTS

| | | | |
|---|---|---|---|
| 2,356,958 | 8/1944 | Von Wangenheim | 236/34 |
| 2,735,619 | 2/1956 | Schutt et al. | 236/34 |
| 2,735,620 | 2/1956 | Bailey | 236/34 |
| 2,837,284 | 6/1958 | Bailey | 236/34 |
| 3,825,214 | 7/1974 | Ciolfi | 248/43 |

FOREIGN PATENTS OR APPLICATIONS

| | | | |
|---|---|---|---|
| 706,386 | 3/1954 | United Kingdom | 236/34 |

*Primary Examiner*—William E. Wayner
*Assistant Examiner*—William E. Tapolcai, Jr.
*Attorney, Agent, or Firm*—Harold W. Adams

[57] ABSTRACT

This is a valve for controlling fluid flow in a conduit in which a valve plate member is moved in and out of engagement with a valve seat in a nozzle in the conduit by means of a thermal actuator to close and open said valve in response to temperature changes in said fluid. The valve plate member is carried by a housing of the thermal actuator and moves relative to a stem that extends from the housing. The free end of the stem is secured by means of a lamina that bridges the nozzle, the plane of said lamina extending in the direction of fluid flow through said nozzle.

19 Claims, 9 Drawing Figures

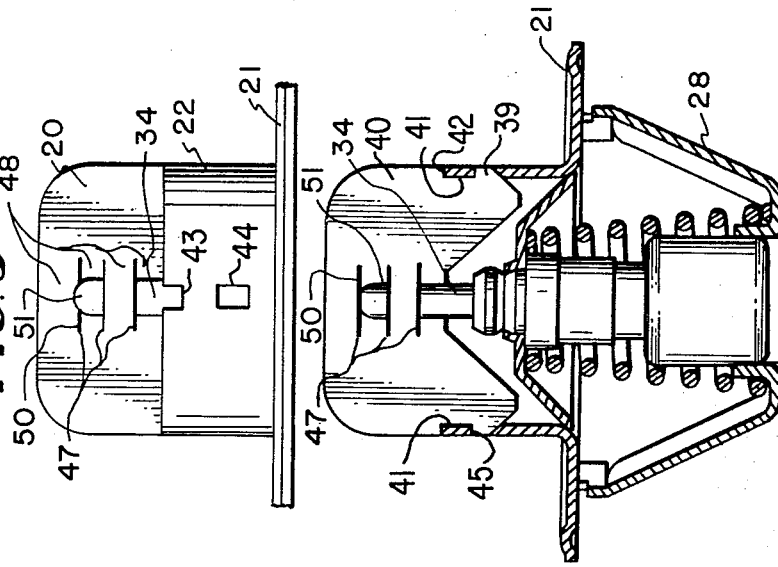
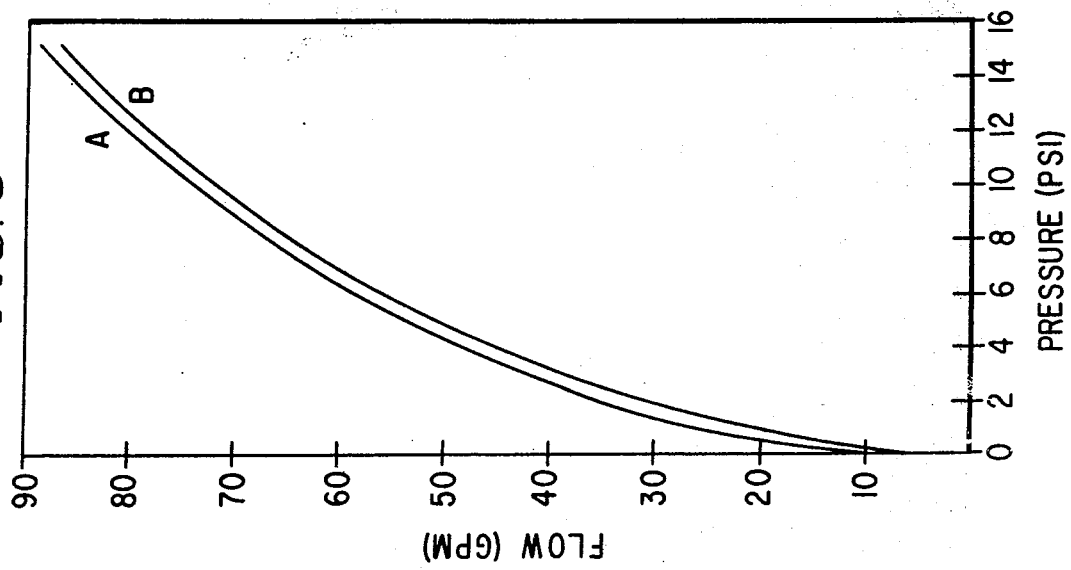
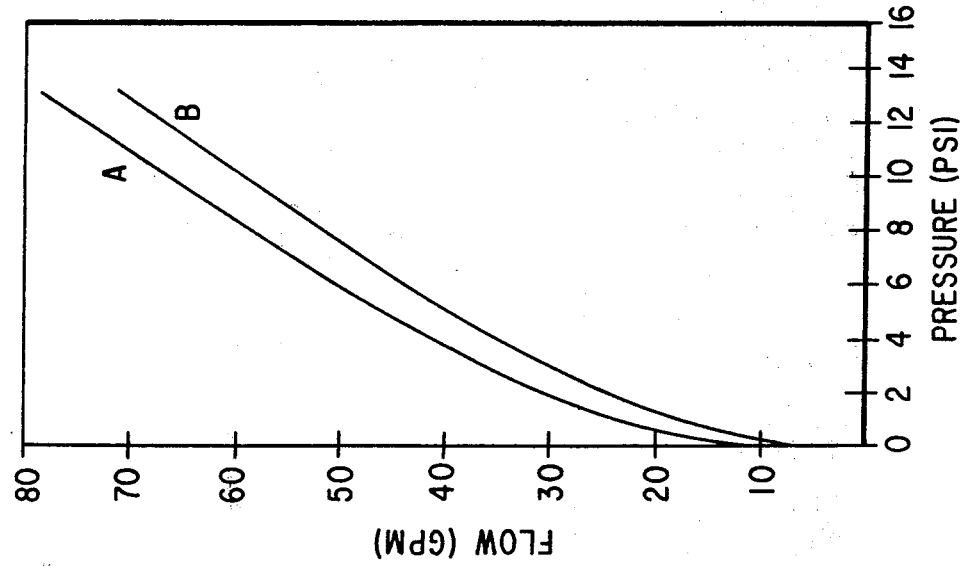

AUTOMOTIVE COOLING SYSTEM THERMOSTAT

BACKGROUND OF THE INVENTION

Thermostatic valves of the general type of this invention are well known and have been used in automotive cooling systems, for instance, for years. For example, see the U.S. Pat. Nos. 2,172,602; 2,356,958; 2,926,853; 2,981,477; 2,777,638 and 2,881,616 to Drapeau, C. D. Bailey, Obermair, Drapeau, Von Wangenheim, Wood, Salmon, Clifford and C. S. Bailey respectively as generally illustrative of this type of control valve.

Known thermostat control valves employ a thermal element or actuator such as that described in U.S. Pat. No. 2,368,181 to Vernet, for instance, to open the valve against a return spring and to close the valve with the assistance of the return spring.

Because conventional and commercially acceptable valves generally have been and are presently formed of a number of expensive parts, the cost of parts and labor, as in most other areas of manufacture, have led to an industry-wide effort to simplify the assembly and installation of such thermostatic control valves. For instance, one such effort to overcome the disadvantages of conventional valves and lower the cost of manufacture and assembly is disclosed in U.S. Pat. No. 3,606,149, to Obermair, cited previously. Here, the patentee puts forward the concept of integrating the design of the flow control assembly with the cooling system fitting.

A disadvantage to this approach from a commercial standpoint is the fact such an integrated structure cannot be used as a replacement for conventional valves already in use. Also the conduit itself must be specially fabricated and the over-all cost and number of parts of the complete assembly offers little, if any, competitive price advantage over the prior art. Further Obermair's patented structure suffers from the same flow efficiency reducing characteristic as those valves disclosed in the aforementioned patents—namely, a relatively wide, large fluid flow impeding bridge structure for securing the stem of a thermal actuator.

Compare this with the large surface area of resistance to fluid flow in the multi-legged spider type bridge shown in U.S. Pat. No. 2,829,834 to Drapeau and the flat and/or curved strap type bridges in U.S. Pat. Nos. 2,777,638 and 2,356,958 to Wood and Von Wangenheim respectively.

Present bridge structure is generally dictated by the strength required of the bridge to support the end of the stem of the thermal actuator permitting movement of the housing relative to the stem to open and close the valve. In engine cooling systems in which a thermostatic valve is installed on the outlet side of the engine between the engine and radiator the conventional bridge may be subjected to stem forces sufficient to push the stem through the bridge. This may also happen when the same thermostat is mounted in the engine inlet between the engine and conventionally a water pump the fluid pressure.

As is shown by the noted patents previous inventors have sought to meet these bridge strength requirements by providing a flat, wide strip, sometimes curved for greater strength or a multi and relatively wide legged spider. While these types of bridges often meet the necessary strength requirements, they have been found to impede rather than improve the fluid flow efficiency of the valve. This may be partially, if not totally, attributed to the fact that in conventional valves with the spider or strap bridge structure the fluid must flow against, out of and around the flow resisting surfaces of the bridge. The greater the surface area of resistance to flow, the more turbulence induced in the fluid as it streams through the valve opening and nozzle. It is believed this turbulent fluid flow may also affect the efficiency of the cooling system downstream of the valve as well.

BRIEF DESCRIPTION OF THE INVENTION

This invention overcomes the long known aforementioned disadvantages of the prior art by providing a thermostatic valve formed of a near minimum number of parts that may be stamped from sheet metal. An improved bridge structure totally unlike conventional bridge structures known to the inventors and which exceeds the necessary strength requirements is one of the aforementioned parts.

In accordance with the invention a lamina or thin, flat metal plate replaces the conventional wide, flat and/or curved strap or multi-legged spider type bridge. The flat plane of the lamina extends parallel to the longitudinal axis of the stem of the thermal actuator in the direction of fluid flow through the valve.

Compared with the relatively wide strap and spider type bridges, the thin leading edge of the lamina offers a greatly reduced surface area of and resistance to fluid flow. The lamina tends to split the stream of fluid and induce a laminar flow past the lamina and through the nozzle. Fluid turbulence is greatly reduced especially as pressures increase and it is believed the laminar flow induced by the lamina type bridge contributes to a marked fluid flow efficiency through and downstream of the valve.

Loop means integrally formed on the lamina receive the stem and also form a rib that provides a stop for the actuator stem. This unique structure eliminates the need for separate fasteners in conventional bridges and achieves greatly improved bridge strength characteristics as well. Since the loops are integrally formed on the lamina only one flat sheet metal part that may be stamped from sheet metal is required for the bridge assembly.

A valve nozzle providing a valve seat around and at its inlet and having an outlet down stream of the inlet is provided with mounting means permitting the lamina to be inserted into either end of and detachably mounted within the nozzle as required.

The nozzle is provided with a flange adapted for mounting in a conduit through which the flow of fluid is to be controlled. For instance, this may be a conduit between the engine block and radiator in a typical automotive type cooling system. Because of the increased strength characteristics of this lamina type bridge and the increase fluid pressures in the engine inlet type cooling control systems, this invention may be even more important.

A U-shaped stirrup or strap secured to the flange slidably supports and guides the housing of a thermal actuator. The housing carries a valve plate member and confines an expansible-contractible elastomeric material. The forces of expansion and contraction of the elastomeric material move the housing relative to a stem extending from the housing, and the end of the stem is secured in the loop means in the lamina and engages a stop providing rib in the plane of the lamina.

A spring is provided for holding the valve plate member on the valve seat, resisting movement of the housing in one direction and opening of the valve and assisting the return movement of the housing and in closing of the valve in the other.

Although the invention has been described as being useful in an automotive engine cooling system, it is understood the invention can be used to control the flow of any fluid and other coolants in response to the temperature of the coolant. Other objects, advantages and features of the invention will become apparent from the following detailed description of preferred embodiments thereof when read with the accompanying drawings wherein:

BRIEF DESCRIPTION OF DRAWING

FIG. 5 is a partial front view of the invention shown in FIG. 1.

FIG. 6 is a cross-sectional view along lines 6—6 in FIG. 1 illustrating the use of an alternative lamina structure in the invention;

FIG. 7, a partial cross-sectional, illustrates an alternative stem structure in accordance with the invention.

FIG. 8 is a graph comparing the fluid flow efficiency of a valve in accordance with the invention (curve A) and a conventional valve having a multi-legged spider type bridge structure (curve B) and FIG. 9 is a graph comparing the fluid flow efficiency of a valve in accordance with the invention (curve A) and a conventional valve having a single relatively wide strap type bridge structure (curve B).

Referring to FIGS. 1–4 of the drawings a preferred embodiment of a thermostatic valve assembly in accordance with the invention is designated generally by the reference numeral 11. As shown in FIG. 2 the valve assembly may be mounted in a fluid outlet 12 of a water cooled engine which is connected to a radiator by means of a conduit 13. The valve assembly 11 comprises but four parts in addition to a thermal actuator designated by reference numeral 14 and a return spring 16. These are a flanged, cylindrical or preferably slightly conical shaped nozzle, a U-shaped stirrup or strap, a poppet valve plate member, and a thin flat plate or lamina bridging the nozzle each generally designated by reference numerals 17, 18, 19 and 20, respectively.

Figure 1:
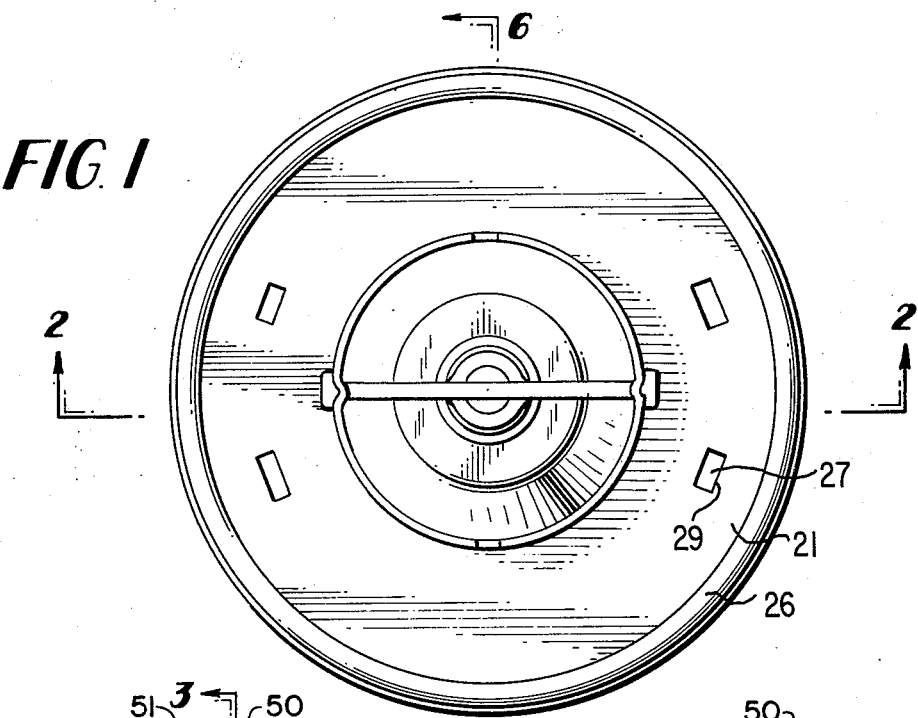
FIG. 1 is a plan view of a preferred embodiment illustrating the use of a thin bridge or lamina in a thermostatic control valve in accordance with this invention.
Figure 3:
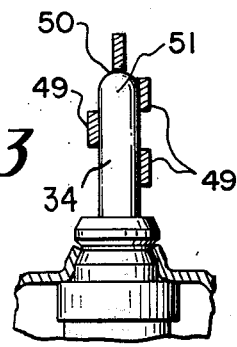
FIG. 3-3 is a partial section taken along the lines 3—3 in FIG. 2 illustrating a cross-section of the lamina.

A circular and radially extending flange 21 is integrally formed on sidewall 22 of the conically shaped nozzle 17, that has an inlet 23 and an outlet 24. The mouth of the inlet 23 where the flange 21 joins the nozzle is shaped to provide a suitable valve seat 25 that cooperates with valve plate member 19 to form a poppet valve that controls the flow of fluid from the engine in conduit 12 through the nozzle 22 and conduit 13 in the direction of the arrow. Flange 21 is provided with a curved, circular shoulder 26 that when clamped between abutting ends of the two conduits provides a seal therebetween when the valve is installed.

Tabs 27 on legs 28 of strap 18 are received in apertures 29 in flange 21 and staked over to secure the strap 18 to the nozzle 17. Legs 28 are curved for added strength and widen into a base 30 having a centrally positioned and circular opening 31, the edge of which is inturned to provide a cylindrical guide 32. The guide 32 slidably receives a housing 33 of thermal actuator 14. Return Spring 16 which fits around the guide 32 is confined between the base 30 and the bottom of an inverted dish shaped valve plate member 19 clinched about a neck of the elongated housing 33. The spring 16 holds the edge of valve plate member 19, on valve seat 25, in a line and sealing engagement and resists opening of the valve.

The thermal actuator 14 commonly called a thermal element and which may by way of example be of the same type as shown and described in the noted U.S. Pat. No. 2,368,181 to Vernet, is well known and need only be described here in general for an understanding of the principle and operation of the invention. As is well known housing 33 may contain a suitable thermally responsive, expansible-contractible, elastomeric wax or the like material not shown which cooperates with a stem 34 extending into the housing 33 to form a power element that opens and closes the poppet valve in response to temperature changes in the coolant surrounding the housing.

Figure 2:
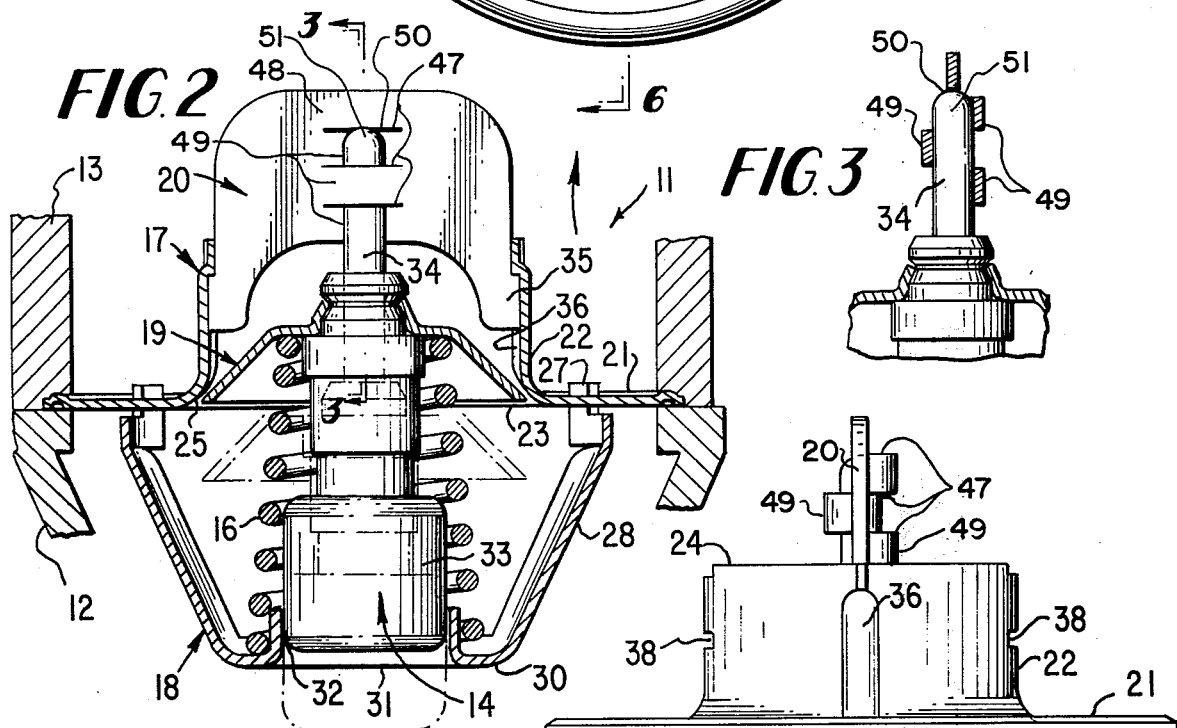
FIG. 2 is a sectional view taken along the lines 2—2 in FIG. 1 and illustrating a typical installation of the invention in a fluid cooling system for an engine.
Figure 4:
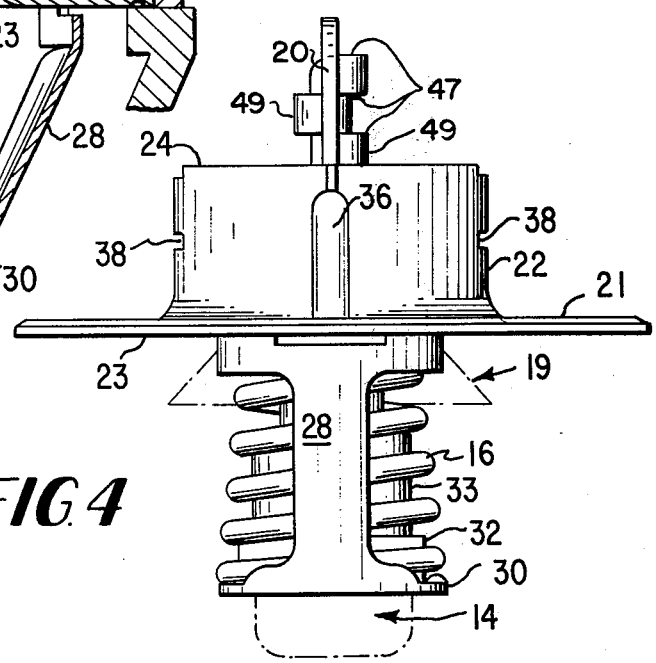
FIG. 4 is a side elevational view of the invention shown in FIG. 1.

Lamina 20 is a flat, thin plate stamped from stainless steel or other metal. Opposing ends of Lamina 20 are formed as tabs 35 that are detachably received in diametrically opposing means comprising elongated slots 36 formed in the sidewall 22 of nozzle 17 as shown in FIG. 2. The elongated slots 36 terminate near the downstream outlet end of nozzle 17 in abrupt shoulders 37 formed by crimps in sidewall 22. The arrangement as just described and as shown in FIG. 2 permits lamina 20 to be inserted into and removed from inlet 23 of nozzle 17. The stem force and fluid passing through the nozzle urge the tabs 35 into engagement with shoulders 37.

As shown in FIGS. 1 and 5 additional means comprising diametrically opposing slots 38 may also be provided for detachably receiving opposing end tabs 39 of a lamina 40 as shown in FIG. 6. Tabs 39 are formed by notches 41 in the lamina which also provide an upper shoulder 42 on each end, the shoulder rests on the bottoms of notch 43 in the end of sidewall 22 when the lamina is inserted through the outlet 24 and tabs 39 received in diametrically opposing slots 44. The lamina 40 preferably is slightly greater in length than the nozzle is in diameter so that when the lamina is inserted into outlet 24 the side wall 22 is deflected and the tabs snap into slots 44. In this position lower shoulders 45 formed by the notches 42 engage the top edges of slots 44 detachably securing the lamina 40 in the nozzle 17.

By providing both diametrically opposing slot means in the nozzle it is seen that either of the lamina 20 or 40 can be selectively employed with a single nozzle depending upon how it is preferred or required to insert the lamina into the nozzle—either from the inlet or outlet side of the valve. This novel adaptability feature is advantageous and required in instances where the bridge can only be or is preferably inserted from one side or the other of the valve either at the time of assembly of the thermostatic valve by the manufacture or at the time of installation of the valve in a particular cooling system. Of course, only one pair of diametrically opposing slot means need be provided when this versatility in detachably securing either lamina 20 or 40 in the nozzle 17 is not required.

Referring now to FIGS. 2–4 and 6 the end of stem 34 is received in one or more closed loops integrally formed in and at the center of the lamina 20 or 40. The closed loops are formed by providing three spaced slits 47 in the flat plane of the lamina 20 that preferably extend transverse to the direction of fluid flow through the nozzle 17. The slits 47 form four fillets or strips 48 across the width of the lamina 20. The three lower and adjacent strips 48 are curved outwardly and alternately from opposite sides of the lamina to form a series of open half loops 49 the adjacent ends of any two of which cooperating to form a closed loop of slightly larger diameter than that of the stem 34. The fourth and uppermost strip remains in the plane of the lamina and forms a supporting rib the leading edge of which provides a stop 50 engaged by the tip 51 of the stem 34.

To assist in preventing wobble of housing 33 and stem 34 about their coincident and longitudinal axis the tip 51 of the stem 34 may be provided with a slot 52 as shown in FIG. 7. The leading edge of the rib is then straddled by the tip of the stem 34, the stop 50 bottoming in the slot 52.

In the preferred embodiment three slits are provided resulting in four strips, one providing a supporting rib and the remainder the series of half, open loops. At least two slits are required to form three strips and at least one closed loop and a rib. It is seen that the number of strips will always exceed the number of slits in the lamina by one which exceeds the number of closed loops that can be formed by one.

In practice the number of slits required is determined by the physical properties and dimensions of the lamina itself, the forces exerted on the supporting rib by the stem and to some but slight extent by the coolant. The stem forces are determined by the power and stroke of the thermal element, the spring, the size of the valve and the pressure and temperatures of the coolant in the conduit. Since nearly all displacement forces are exerted along the longitudinal axis of the stem little force is exerted by the stem outwardly against the open half loops which serve as guides principally. In practice, the strips forming these guides can be relatively narrow in width, the slits forming same ing spaced a distance determined by this desired width.

The supporting rib is subjected to and must withstand the entire vertical displacement force on the stem without tearing at the end of the slit. Any deformation, twisting or bending of the rib from the plane of the lamina must be avoided to prevent displacement of the stem and housing from their longitudinal axis. This is necessary to assure a positive opening and closing of the valve.

The width of the rib in the plane of the lamina is related to the stem forces the lamina can withstand for a lamina of fixed length and width. Since the width of the strips forming the guide loops can be relatively narrow, the width of the supporting rib and thus strength of the bridge can be increased considerably by more closely positioning the slits forming the strips for the guide loops. This increase in bridge strength is possible with no other change of physical dimension of the bridge forming lamina.

The width and shape of the lamina may be varied as desired and as permitted for use in any given nozzle. Since the flat plane of the lamina extends parallel with and in the direction of fluid flow through the nozzle the increase of width of the lamina is believed to improve the fluid flow efficiency of the valve. This is because the effective surface area of resistance to fluid flow (the leading edge of the lamina) remains the same whatever the width of the lamina. The increased width is believed to improve the laminar flow of fluid.

The thickness of the lamina 20 is therefore not of such controlling importance as is the thickness of know strap or spider type bridges where, because the stem forces are directed transversely against the flat bridge surfaces, there is more of a danger of the valve stem piercing or deforming the strap or web when the valve is subjected to normal automotive engine cooling system conditions for instance. However, the thickness of the lamina 20 and 40 may be varied as required but this would in turn vary the surface area of resistance to fluid flow of the leading edge of the lamina very little. The effect of the leading edge of the lamina upon fluid flow through the nozzle may be diminished by forming it as a knife or cutting edge.

By using a lamina as a bridge and thus reducing the surface area of resistance to fluid flow in accordance with this invention the flow efficiency of the valve is increased. This increase in fluid flow efficiency is believed attributable to the fact there is less turbulence in the fluid flowing through the nozzle due to the decrease in the surface area of resistance to fluid flow. Another factor is the action of the lamina in dividing the flow of fluid in the nozzle into two streams and then inducing a laminar flow in both streams as they pass the flat planar surfaces on opposite sides of the lamina. This action tends to straighten the stream of fluid downstream of the valve and nozzle thereby contributing to an improved fluid flow efficiency downstream of the valve. This it is believed tends to improve the overall efficiency of the cooling system.

The lamina or thin bridge is believed to account for the marked increase in fluid flow efficiency of this invention compared to conventional valves as is clearly demonstrated by the performance curves in FIGS. 8 and 9. Referring to FIG. 8, curve B represents fluid flow in gallons per minute at varying pressures through a known and commercially available DVN-23 thermostatic valve manufactured by The Dole Division of The Dole Valve Company. This valve has a three-legged spider type bridge, the minimum surface width of each leg opposing fluid flow being approximately 0.155 inches. All measurements of fluid flow were made with the valve full open over the pressure range shown.

The multi-legged spider type bridge of this commercially available valve was then replaced with a thin lamina type bridge in accordance with the invention and as shown in FIG. 2. The lamina was stamped from a stainless steel plate 0.05 inches thick and assembled in the test valve as described herein. No other changes were made to the test valve. Again fluid flow through the valve was measured over the same pressure range with the valve fully open.

The results of this last test are shown in curve A of FIG. 8 (as clearly shown by the two curves) a greater fluid flow is achieved through a valve in accordance with the invention than that through the known valve over substantially the entire pressure range. This comparison clearly establishes the greater and markedly improved fluid flow efficiency of the invention over the commercially available valve having a multi-legged spider type bridge.

Curves A and B of FIG. 9 demonstrate an even greater fluid flow efficiency of a valve in accordance with the invention (curve A) compared to that of a known and commercially available valve having a strap type bridge such as a DVN-26 thermostatic valve also manufactured by the Dole Valve Company (Curve B). The strap in the test valve was found to vary from approximately 0.200 to 0.150 inches in width. Again all measurements were taken as described in connection with the curves A and B in FIG. 8.

As can be seen from Curves A and B of FIGS. 8 and 9, the fluid flow efficiency of a thin bridge type valve in accordance with the invention is markedly improved over that of commercially available valves employing either a spider or strap type bridge for supporting the stem of a thermal actuator.

A perferred embodiment of the invention has been described for use in a fluid cooling system for an internal combustion engine. Typically the valve may be used as a bypass valve that is closed preventing flow of fluid through a cooling radiator when the temperature of the fluid is below a determined temperature or temperature range. When the fluid temperature reaches these determines temperatures, the thermal actuator opens the valve to allow fluid to flow through the radiator.

For instance, a thermostatic valve in accordance with the invention in such a cooling system may be designed to open at a nominal temperature of 192°F within an opening temperature range of 188°–195°F. The invention can be designed and arranged to operate within the limits of the volume of flow required, temperature and pressure of the fluid in the system and the properties and characteristics of the thermal actuator employed—all of which factors being well known to those skilled in the art.

It is to be understood however that the use of a lamina type bridge structure in accordance with the principles of the invention is not to be limited to bypass valves in fluid cooled engines but can find application in any instance wherein a bridge of the type described is subjected to the forces of opening and closing a valve in a fluid conduit.

Therefore, although preferred embodiments of the invention have been described in detail it is intended that the invention be limited only by the scope of the appended claims.

What is claimed is:

1. In a thermostatic valve having a valve opening for mounting in and controlling the flow of fluid in a conduit through said valve opening, said valve including a thermal actuator means responsive to temperature changes in said fluid, said thermal actuator means having a movable housing that carries a valve closure member on an inlet side of said valve opening and a stem extending from said housing through said valve opening and fixedly secured on an outlet side thereof, relative movement between said housing and stem causing said closure member to open and close said valve opening, the improvement comprising:
   a lamina mounted in and bridging said valve, the plane of said lamina extending in the direction of fluid flow through said valve opening thereby substantially reducing the surface area of resistance to fluid flow through said valve opening to that of the leading edge of said lamina, said lamina including means for fixedly securing said free end of said stem on said outlet side of said valve.

2. A thermostatic valve as defined in claim 1 wherein the means for securing said stem comprises:
   at least one closed loop on said lamina for receiving said stem; and
   a supporting surface on said lamina in the plane of said lamina, said loop and said supporting surface securing said end of said stem.

3. A thermostatic valve as defined in claim 1 wherein said closed loop comprises adjacent, open, half-loops integrally formed in opposite faces of said lamina, said open, half-loops cooperating to form said closed loop for receiving said stem.

4. A thermostatic valve as defined in claim 1 wherein said adjacent open, half-loops are semicircular and said closed loop circular.

5. A thermostatic valve as defined in claim 1 wherein three or more adjacent, open half-loops are alternately formed in opposite faces of said lamina.

6. A thermostatic valve for controllig the flow of fluid in a conduit comprising:
   valve means including a valve seat;
   thermal actuator means mounted for opening and closing said valve means in response to the temperature of said fluid in said conduit, said thermal actuator including a movable housing having a valve member mounted thereon and confining an expansible-contractible elastomeric material;
   a stem extending from said housing and having a free end, said stem being subject to the forces of expansion and contraction of said elastomeric material resulting in relative movement between said movable housing and said stem with the free end of said stem secured, externally of said housing, said relative movement between said housing and said stem moving said valve member off and on said valve seat thereby opening and closing said valve means thereby controlling the flow of fluid through said valve means; and
   means bridging said valve comprising a lamina, the plane of said lamina extending in the direction of fluid flow through said valve means, said lamina including means for fixedly securing said end of said stem externally of said housing.

7. A thermostatic valve as defined in claim 6 wherein said means for securing said stem comprises at least one closed loop formed on said lamina for receiving said stem and a rib providing a stop for the end of said stem, an edge of said stop lying in the plane of said lamina, said closed loop and said stop securing said stem.

8. A thermostatic valve as defined in claim 7 wherein said closed loop comprises adjacent, open half-loops integrally formed in and projecting from opposite faces of said lamina.

9. A thermostatic valve as defined in claim 8 wherein three or more adjacent, open half-loops are integrally formed in and alternately project from opposite faces of said lamina.

10. A thermostatic valve as defined in claim 1 wherein said valve includes a nozzle having an inlet and an outlet and a valve seat in and around said inlet; and means formed in said nozzle between said inlet and said outlet for detachably supporting said lamina across said nozzle.

11. A thermostatic valve as defined in claim 10 wherein said means for detachably supporting said bridge means comprises at least two diametrically opposing slots formed in said nozzle, said slots detachably receiving opposing ends of said lamina.

12. A thermostatic valve as defined in claim 10 wherein means are formed in said nozzle for detachably supporting said bridge means across said nozzle whereby said bridge means may be selectively inserted into and withdrawn from said inlet or said outlet.

13. A thermostatic valve as defined in claim 10 including a flange extending radially from said nozzle;
   a stirrup having two legs and a base attached to said flange, said thermal actuator means mounted on said stirrup, said stirrup including a guide in said base for slidably receiving said housing;
   and a spring confined between said valve member resisting movement of said valve member from said valve seat.

14. A thermostatic valve as defined in claim 13 wherein said spring extends around said guide in said base and said housing.

15. A thermostatic valve as defined in claim 7 wherein the end of said stem is provided with a groove, said rib of said lamina being received in said groove, the bottom of said groove engaging said stop.

16. A thermostatic valve for controlling the flow of fluid in a conduit comprising:
   a nozzle having an inlet and an outlet and a valve seat in and around said inlet;
   means for mounting said nozzle in a conduit through which the flow of fluid is controlled;
   a valve plate member for engaging said valve seat;
   a thermal actuator comprising a housing filled with an elastomeric, temperature responsive, expandible-contractible material and a stem having an end extending longitudinally from said housing, said housing being free to move relative said stem with a free end of said stem secured externally of said housing, said housing carrying said valve plate member to move the same relative to said valve seat to open and close the valve inlet;
   spring means for biasing said valve plate member in opposition or support of said forces of expansion and contraction respectively to said elastomeric material caused by changes in temperature of said fluid, said spring means normally urging said valve plate member toward engagement with said valve seat when the temperature of said elastomeric material as determined by the temperature of said fluid in said conduit is below a predetermined value;
   a lamina bridging said nozzle between said inlet and said outlet of said nozzle, the flat plane of said nozzle extending in the direction of flow of said fluid through said valve seat and nozzle;
   and means formed on said lamina for fixedly securing the end of said stem.

17. A thermostatic valve adapted for mounting and controlling fluid flow in a conduit comprising:
   a nozzle having a valve seat therein;
   a flange radially extending from said nozzle being adapted for mounting said nozzle in a conduit;
   a U-shaped strap member having spaced legs attached at one end to said flange and interconnected at the other by a base, said base having an opening;
   a thermal actuator comprising a housing filled with an expansible-contractible temperature responsive elastomeric material slidably received in said opening in said base;
   a valve plate for engaging said valve seat secured to said housing;
   a spring confined between said valve plate member and said base and around said housing, said spring urging said valve plate member to engage said valve seat; and
   a stem having an end extending externally from said housing; and
   a lamina bridging said nozzle for fixedly securing said end of said stem, the plane of said lamina extending in the direction of fluid flow through said nozzle whereby forces of expansion and contraction of said elastomeric material in said housing caused by temperature changes therein move said housing relative to said stem and said valve plate member relative to said valve seat to open and close said valve to control the flow of fluid through said nozzle in said conduit.

18. A valve for controlling the flow of fluid in a conduit comprising:
   a nozzle having an inlet and an outlet;
   a valve seat around said inlet;
   means for mounting said nozzle in said conduit;
   a thermal actuator including a movable housing and a stem having an end extending longitudinally therefrom;
   a valve plate member secured to said housing, said thermal actuator moving said valve plate member relative to said valve seat in response to the temperature in said conduit to open and close said valve formed thereby;
   spring means for urging said valve plate member into engagement with said valve seat and said valve in a closed position so long as the temperature of said fluid is less than a determined value; and
   a lamina bridging said nozzle downstream of said inlet to said nozzle, the plane of said lamina extending parallel with the longitudinal axis of said nozzle, said lamina having at least two spaced slits therein forming at least three strips, each of said two strips nearest said inlet and adjacent each other forming an open, half-loop when forced outwardly from an opposite side, said adjacent open, half-loops forming a closed loop for receiving said stem, said third strip forming a rib, the leading edge of said rib providing a stop for the end of said stem.

19. A valve as defined in claim 18 wherein said lamina has three or more spaced slits forming a number of strips that exceeds the number of slits by one, said strip farthest from said inlet forming a rib, the leading edge of said rib providing a stop for said stem, the remainder of said strips being alternately forced outwardly from opposite faces of said lamina to form a series of open, half-loops corresponding to the number of slits, adjacent ones of said open half-loops forming closed loops for receiving said stem.

* * * * *